United States Patent [19]
Entleitner et al.

[11] Patent Number: 6,091,852
[45] Date of Patent: Jul. 18, 2000

[54] METHOD OF PATTERN RECOGNITION AND METHOD OF CREATING AN N-DIMENSIONAL OBJECT

[75] Inventors: Renate Entleitner, Kottgeisering; Michael Soegtrop, Poing, both of Germany

[73] Assignee: Delphi 2 Creative Technologies GmbH, Munich, Germany

[21] Appl. No.: 08/894,807

[22] PCT Filed: Mar. 4, 1996

[86] PCT No.: PCT/DE96/00381

§ 371 Date: Oct. 14, 1997

§ 102(e) Date: Oct. 14, 1997

[87] PCT Pub. No.: WO96/27848

PCT Pub. Date: Sep. 12, 1996

[30]     Foreign Application Priority Data

Mar. 3, 1995 [DE] Germany .............. 195 07 564

[51] Int. Cl.[7] .................................................. G06K 9/62
[52] U.S. Cl. ............................................................ 382/181
[58] Field of Search .................................. 382/181, 190, 382/191, 195, 206

[56]     References Cited

U.S. PATENT DOCUMENTS

5,793,371  8/1998  Deering ................................. 345/418
5,809,183  9/1998  Serizawa et al. ..................... 382/301

OTHER PUBLICATIONS

Leu, "Computing a Shape's Moments From Its Boundary," Pattern Recognition, vol. 24, No. 10, 1991, pp. 949–957.

*Primary Examiner*—Andrew W. Johns
*Attorney, Agent, or Firm*—Oblon, Spivak, McClelland, Maier & Neustadt, P.C.

[57]     ABSTRACT

The invention concerns a method of pattern recognition in which the pattern of an n-dimensional object is captured by a data-processing device which can image and process the n-dimensional object with different degrees of precision (s) within a computer. The invention comprises the following steps: the n dimensional object is imaged in the computer with at least two different degrees of precision (s); at least one parameter (U) of the n-dimensional object is determined by integration or summation for each imaged degree of precision(s); and the functional dependency (U(s)) of the integrated or summed parameter or parameters on the degree of precision(s) is determined and used as a measure for the pattern to be recognized. The pattern-recognizing method according to the invention is likewise based on these method steps.

12 Claims, 10 Drawing Sheets

Fig. 1a (Method A)
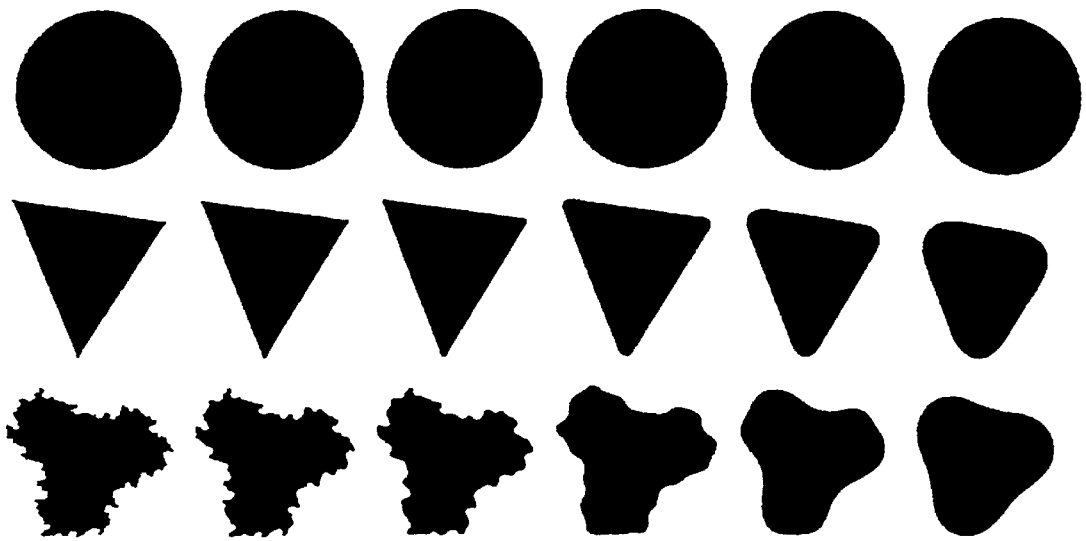
Fig. 1b
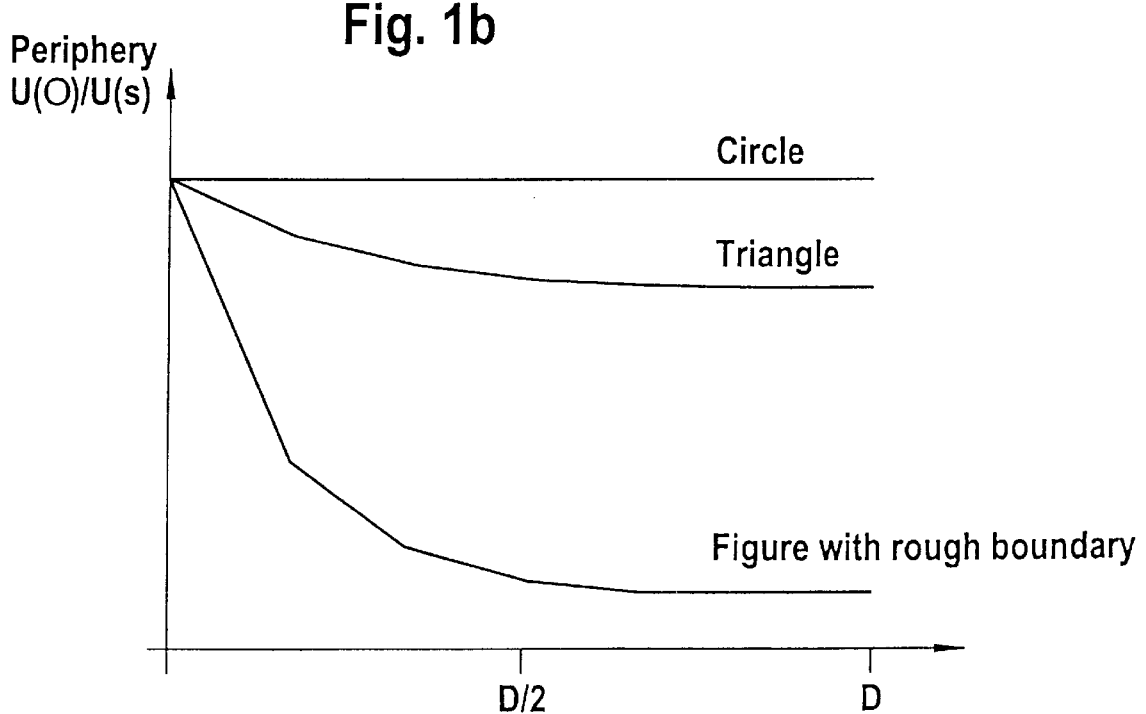

Fig. 2a (Method B)

Fig. 4a                    Fig. 4b or somewhat more complex:

Polygon composed of the sides and angles of the start polygon:

The marked angles have inverse sign compared with the corresponding angles of the start polygon.

angle enlarged by a factor of 1.5 angle enlarged by a factor of 1.25 original angle angle reduced by a factor of 0.75 angle reduced by a factor of 0.5

METHOD OF PATTERN RECOGNITION AND METHOD OF CREATING AN N-DIMENSIONAL OBJECT

BACKGROUND OF THE INVENTION

1. Field of the Invention

The present invention relates to a technique for pattern recognition, in which the pattern of an n dimensional object is measured and recognized by means of a data-processing system capable of mapping and processing the n-dimensional object with different accuracy (s) n computer memory. Further subject matter of the invention is a technique for generating or modifying an n-dimensional object being simulated or represented by a data-processing system, the data-processing system being capable of simulating or representing the n-dimensional object with different accuracy (s).

2. Description of the Background

Pattern recognition is a central problem in many technical fields. Such pattern recognition is supposed to allow n dimensional objects to be sufficiently measured by means of a data-processing system so that the data-processing system can identify with the highest possible precision to which n-dimensional object the respective pattern must be assigned. Highly precise pattern recognition of n- dimensional objects would make it possible, for example, to steer vehicles of any kind automatically, so that accidents due to human error could be largely prevented. It would also be possible to recognize the handwriting of any given person automatically and with high precision. Even the manufacture of automatic machines or robots equipped with intelligent sensor systems would be no problem if highly precise pattern recognition were available.

Numerous pattern-recognition techniques are already known from the prior art. One disadvantage of the known techniques, however, is that each is usable only for special types of objects. The general usability of these known techniques is therefore greatly restricted. A further disadvantage of the known techniques, particularly for highly complex or fractal structures, is that reliable recognition is not possible at all or requires extremely large computing power, and so real-time pattern recognition is not possible.

The problem of simulating and/or representing n-dimensional objects by means of a data-processing system is now being encountered in numerous technical fields. For example, in the object-oriented drawing, image-processing, vector-graphics and CAD programs now in vogue, it is necessary to modify certain selected objects appropriately by selective manipulation. The techniques known heretofore for selective modification or initial generation of such an object are often user-unfriendly and laborious. In particular, rapid generation or modification of objects having highly complex structure is difficult for these known techniques.

The objective of the invention is to improve a pattern-recognition technique in which the pattern of an n-dimensional object is measured by means of a data-processing system capable of mapping and processing the n-dimensional object with different accuracy(s) in computer memory, and an object-manipulation technique for generating or modifying an n-dimensional object being simulated or represented by a data-processing system, the data-processing system being capable of simulating or representing the n-dimensional object with different accuracy (s), to the extent that a universally usable technique for rapid and precise pattern recognition and for extremely simple manipulation of the n-dimensional object in question is ensured.

This objective is achieved according to the invention with the steps of the pattern-recognition technique characterized in that:

a) the n-dimensional object is mapped in at least two different accuracy(s) in computer memory, b) for each mapped accuracy(s) at least one characterizing variable (U) of the n-dimensional object is determined by integration or summation, and in that c) the functional dependence (U(s)) of the integrated or summed characterizing variable(s) on accuracy(s) is determined and used as a measure of the pattern to be recognized.

The steps of the object-manipulation technique are characterized in that:

a) a functional dependence (U(s)) of at least one characterizing variable (U) on accuracy (s) is input beforehand, the characterizing variable (U) corresponding to a property of the n-dimensional object obtainable by integration or summation, and in that b) the n-dimensional object is modified or generated using the previously input functional dependence (U(s)).

SUMMARY OF THE INVENTION

The basic principle of the invention therefore comprises identifying an n-dimensional object through its accuracy-dependent disproportion or unevenness, as well as modifying or manipulating an object generated by a data-processing system through its accuracy-dependent disproportion. Since substantially all data-processing systems are inherently capable of simulating or representing a given n-dimensional object with different accuracy, the cited basic principle of the invention can be implemented without problem by any conventional data-processing system, and so commensurately low costs are possible. Furthermore, the software required for the purpose can access highly efficient and correspondingly fast algorithms, and so the pattern recognition or object manipulation according to the invention is characterized by extremely high processing speed. A last further advantage of the invention is that it can be applied successfully to objects of the most diverse geometry, and so even fractal structures do not pose any kind of problem.

According to the steps of the pattern recognition technique the objective underlying the invention with respect to the pattern-recognition technique is achieved in detail in that the n-dimensional object in question is mapped in at least two different accuracies (s) in the computer memory, in that at least one characterizing variable (U) of the n-dimensional object is determined by integration or summation for each mapped accuracy, and in that the functional dependence (in other words a value U(s)) of the integrated characterizing variable or variables is defined by the accuracy and used as a measure for the pattern to be recognized. By determining this functional dependence U(s), it is possible to represent the accuracy-dependent disproportion of the n-dimensional object to be recognized very simply and nevertheless extremely characteristically. It is then possible, according to the embodiment of the invention in which the pattern to be recognized is identified by comparison of the measured functional dependence (U9s0) with stored characteristic curves, for example, to identify the pattern to be recognized by comparing this measured functional dependence U(s) with stored characteristic curves (which if necessary are input beforehand). Such a comparison can be achieved extremely easily by computational operations.

According to the invention, the integrated or summed characterizing variable used for the technique according to the invention is selected such that the optimum reference to the respective n-dimensional object is achieved. For example, a relevant property of the object such as topography, color distribution, surface, boundary profile or density distribution is mapped in computer memory, and then a grand total of this relevant property is calculated as the integral characterizing variable, such as total volume, total value of color density, total surface, total boundary length or total value of density. Since the n-dimensional object to be recognized obviously could be not only an optically detectable object but also an object detectable by other sensors such as radar receivers, other relevant properties such as the radiation intensity profile, for example, could also be used if necessary to calculate the integral characterizing variable.

In pattern recognition of a plurality of n-dimensional objects, these can often be easily compared with each other by normalizing the size of all objects. According to an embodiment of the invention, therefore, it is provided that the respective integral characterizing variable and/or the accuracy will be normalized to a specified quantitative value of the n-dimensional object. Examples of quantitative values that can be used for normalization are volume, area, surface or periphery of the object. By means of such normalization it is also possible to achieve pattern recognition independently of distance. The functional dependence that governs pattern recognition can be expressed, for example, by the accuracy-dependent fractal dimension of the object under examination. Alternatively, it is also possible to determine the functional accuracy by an averaging technique, in which the accuracy represents the geometric extent or else the thickness of the averaging process. As another alternative, it is possible to define the functional dependence by generating a grid, in which case the accuracy represents the fineness of the grid and the resulting elements of irregular objects are replaced by predefined or plane elements.

The respective function curves obtained by using these different functional dependences (fractal dimension, averaging, grid generation) are of course themselves different. Nevertheless, each of these different techniques makes it possible to recognize the pattern of the respective object being measured. On the other hand, it is conceivable that a given object could be examined by means of a plurality of different functional dependences if necessary, in order to allow recognition of further differences between the objects.

According to en embodiment of the invention, the respective accuracy needed to determine the functional dependence can be the resolution or the faithfulness to detail with which the n-dimensional object is mapped in computer memory.

The objective underlying the invention with respect to the object-manipulation technique is achieved according to the steps of the object-manipulation technique in that a functional dependence of at least one characterizing variable on accuracy is input beforehand. The said characterizing variable corresponds to a property of the n-dimensional object obtainable by integration or summation, and the n-dimensional object is modified or generated by using the previously input functional dependence. Since the functional dependence can be easily input beforehand by a user or automatically, the invention permits extremely practical and simple modification or initial generation of an n-dimensional object.

Those properties of the n-dimensional object that are not defined by the chosen functional dependence are generated, according to an embodiment of the invention, by means of a random generator, by inputting rules beforehand, by manual inputs or even by a combination of these options. In a further embodiment of the invention, particularly simple generation or modification of an object is achieved by means of an optical pointing device such as a mouse or the like, since in such a case the user, by the graphical technique, can very easily define or change the functional dependence governing the object to be generated or manipulated.

The invention will be explained in more detail hereinafter by means of descriptions of practical examples with reference to the drawings, wherein:

FIG. 1A shows three different objects, the periphery of which is determined by an averaging technique as a function of the respectively chosen accuracy;

FIG. 1B shows the respective accuracy-dependent curves of the periphery of the objects shown in FIG. 1A;

FIG. 2A shows a triangular object, the periphery of which is determined by a grid-generation or incremental length-change technique;

FIGS. 4a to 4f show further examples of object-manipulation techniques according to the invention.

DETAILED DESCRIPTION OF THE INVENTION

In FIG. 1A, two-dimensional or planar objects, in this case a circle, a triangle and an irregularly shaped or fractal area as viewed from top to bottom, are shown as examples of the n-dimensional objects which can be recognized with the pattern-recognition technique according to the invention. To use pattern recognition to identify which of the respective objects is being viewed, an averaging technique in which a specified number of pixels is combined and averaged is applied in this practical example of the invention. The accuracy or resolution and faithfulness to detail decrease as the number of pixels combined or averaged increases.

FIG. 1A shows, at the left, that representation of each object in question (circle, triangle or fractal area) at which the highest resolution is chosen with which the data-processing system in question is capable of mapping objects of such type in memory. At this highest resolution, a single storage location is allocated to each pixel, and so the "value" of the pixel is defined by the storage location. FIG. 1A also illustrates how the resolution of the object in question decreases progressively from left to right. Because of the lowered resolution, a progressively larger number of pixels is averaged, and so the fine contours of the objects become progressively more "blurred".

For each of the six accuracy gradations with which each object is mapped and shown in FIG. 1A, the total periphery of the object in question is calculated by summation or integration. If each value of this total periphery is plotted in a graph, the diagram shown in FIG. 1B is ultimately obtained. This illustrates the functional dependence of the periphery U on the chosen accuracy(s), or in other words a curve described by a function U(s). As is evident from FIG. 1B, the technique according to the invention yields a different curve of the functional dependence U(s) for each of the three illustrated objects, and so this functional dependence can be used as a measure of the pattern or object to be recognized. By comparing the curve in question with stored curves, for example, it is therefore possible to achieve pattern recognition.

FIG. 2A shows a further embodiment of the pattern-recognition technique according to the invention. This technique differs from that shown in FIG. 1A in that grid generation or incremental length change is applied instead of the averaging technique. As follows from FIG. 2A, the accuracy in this practical example is represented by the fineness of the grid, the resulting elements of the object in question (triangle) being replaced by predefined plane elements. In FIG. 2A, two different grid spacings or accuracies are illustrated as examples.

Figure 2B:
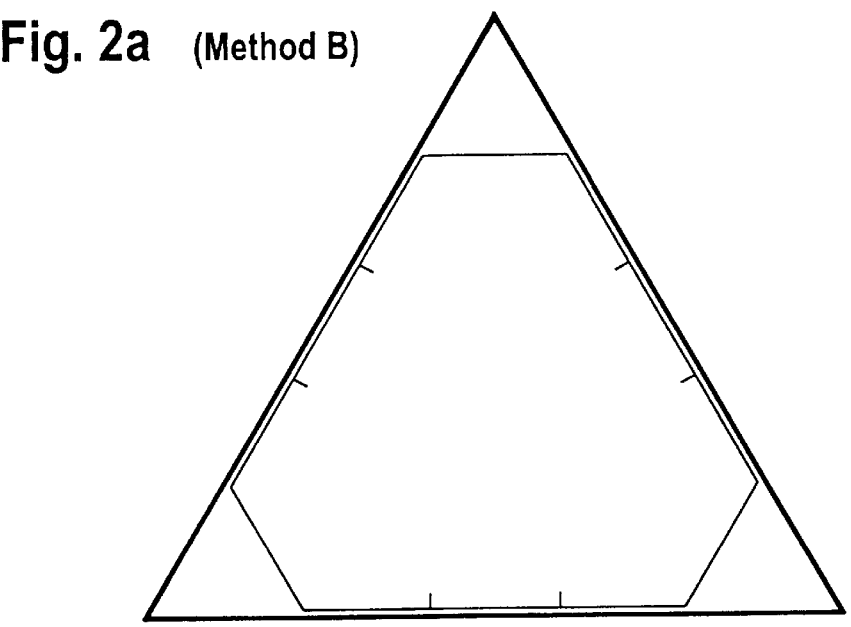
FIG. 2B shows the curve of the functional dependence of the periphery of three objects when grid generation is used.

When the technique shown in FIG. 2A is applied to different objects such as a circle, a triangle or a rough-edged shape, the characteristic curves shown in FIG. 2B are obtained for the functional dependence of periphery on accuracy or on grid spacing, and as in the first practical example can be used as a measure of the pattern to be recognized.

Figure 2B:
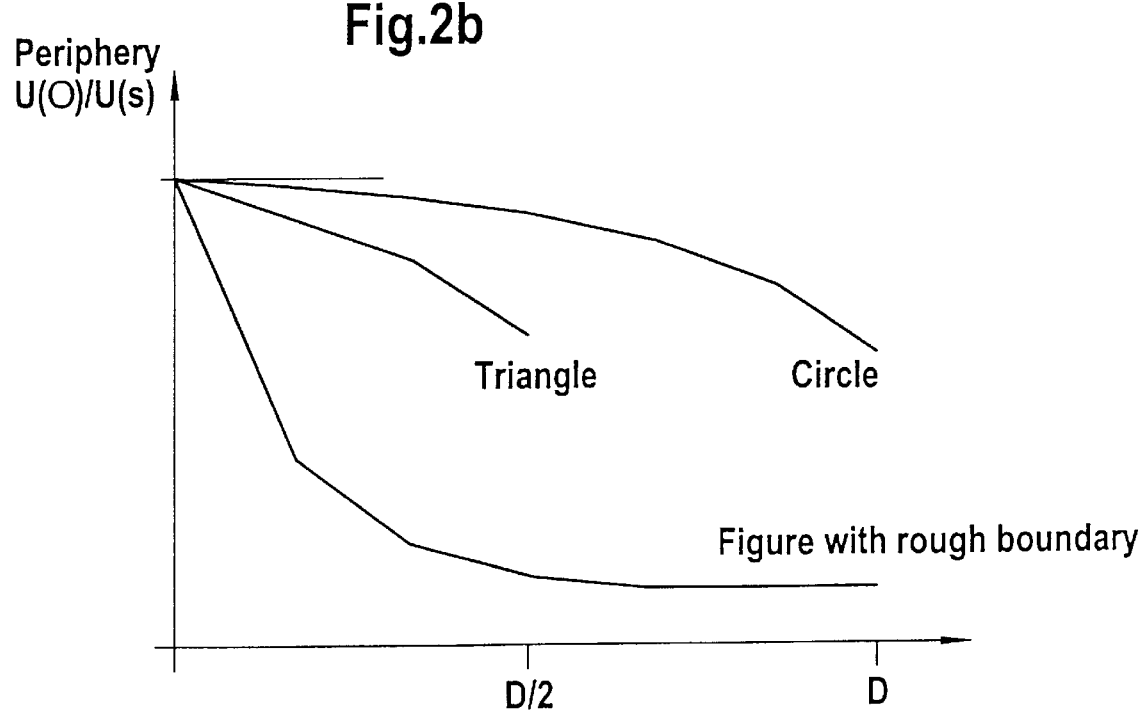

If necessary, it is obviously possible simultaneously to apply both techniques shown in FIGS. 1 and 2, if the hit rate achieved in pattern recognition with one of these techniques is not yet satisfactory. Several practical examples of object manipulation or object generation will be explained in more detail hereinafter with reference to FIGS. 3 and 4.

A very general technique of pattern or object shaping comprises, for example, transforming a geometric object to a function and then, by an operation such as Fourier transform, expanding the said function to an orthonormal function system. In this process, the scale-dependent function or functional dependence U(s) is given by the expansion coefficients in the form of a map of the index space of the function system onto the space of the expansion coefficients. Any arbitrary object (and certainly not merely a polygon) can be input beforehand and modified via U(s) for the purpose of pattern shaping.

The boundary of an area will be considered as an example hereinbelow. One possibility of generating a single-valued function comprises identifying the direction of the boundary line for each point of the boundary. An arbitrary point is chosen as the starting point, and the angle α is determined as a function of the length of the path 1 traveled along the boundary. In order to prevent a continuous increase of the angle α or a discontinuity in α when the starting point is reached again, a function that increases linearly from 0 to $2\pi$ during one tour of the periphery is subtracted from α(1).

Figure 3A:
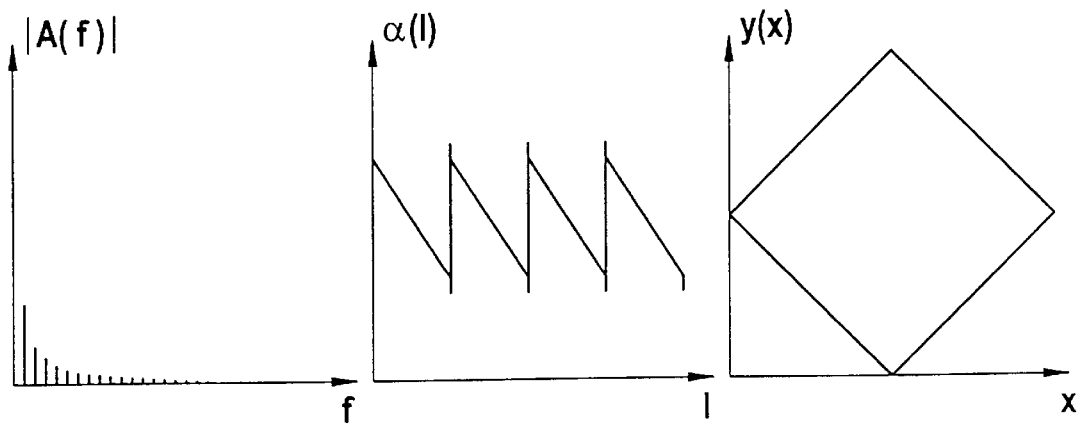
FIG. 3a shows a first step in an object-manipulation technique, in which a square manipulated by a Fourier transform is provided as the object.
Figure 3B:
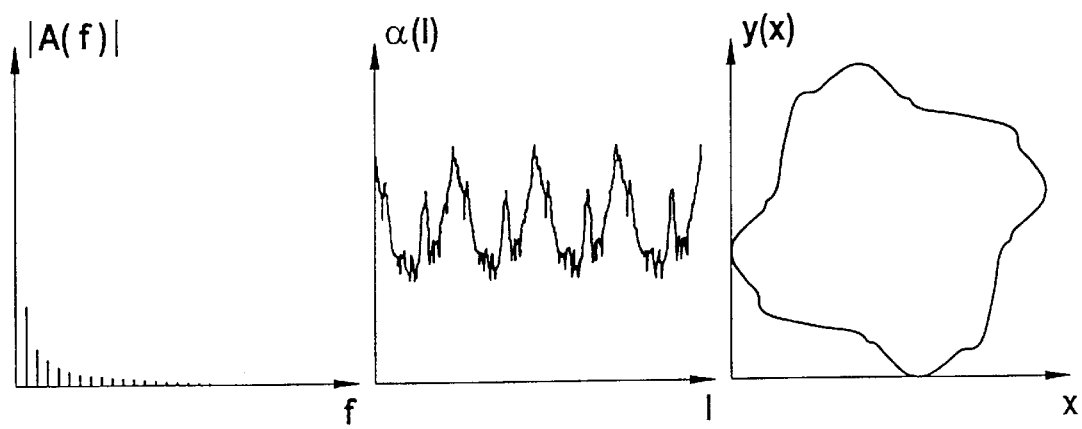
FIGS. 3b and 3c show manipulations of the square shown in FIG. 3a, in which the phases have been replaced by random numbers.
Figure 3C:
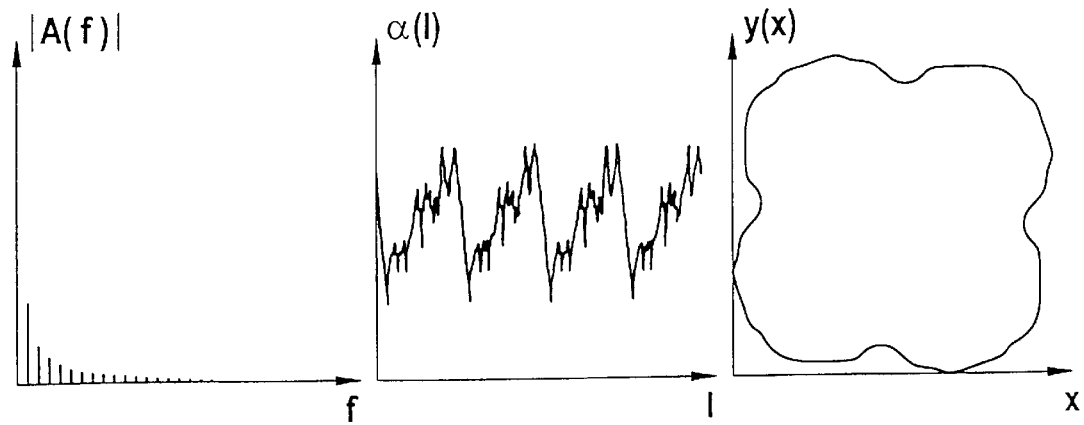
Figure 3D:
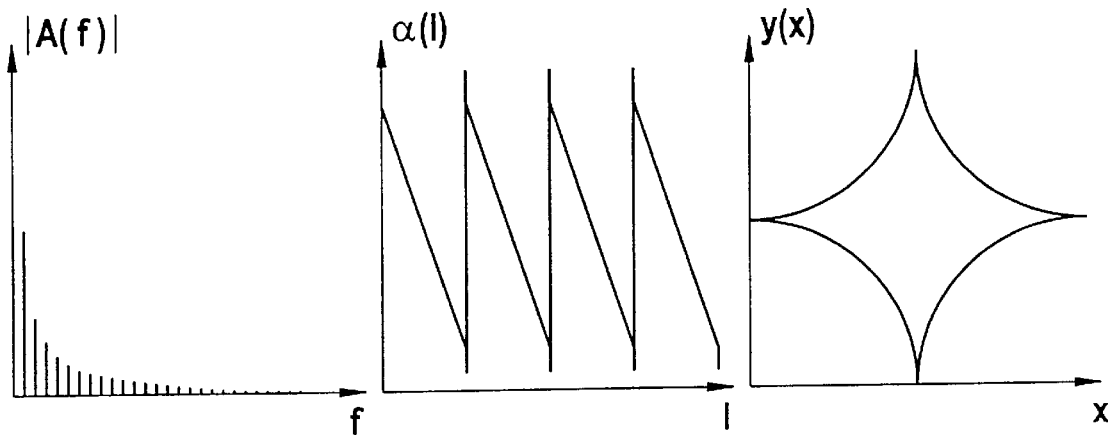
FIG. 3d shows a manipulation of the square shown in FIG. 3a, in which the amplitudes have been scaled up by a factor of two.
Figure 3E:
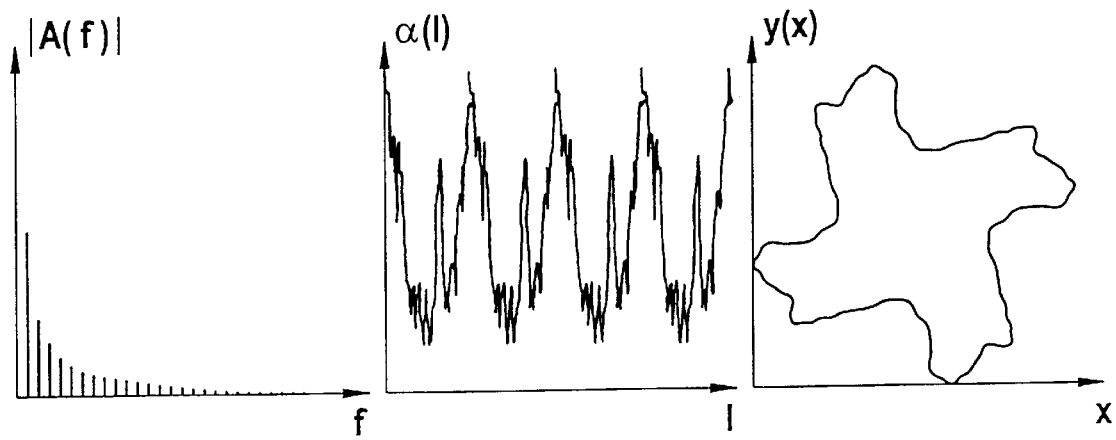
FIGS. 3e and 3f show manipulations of the object shown in FIG. 3d and obtained by manipulation, in which the phases have been replaced by random numbers.
Figure 3F:
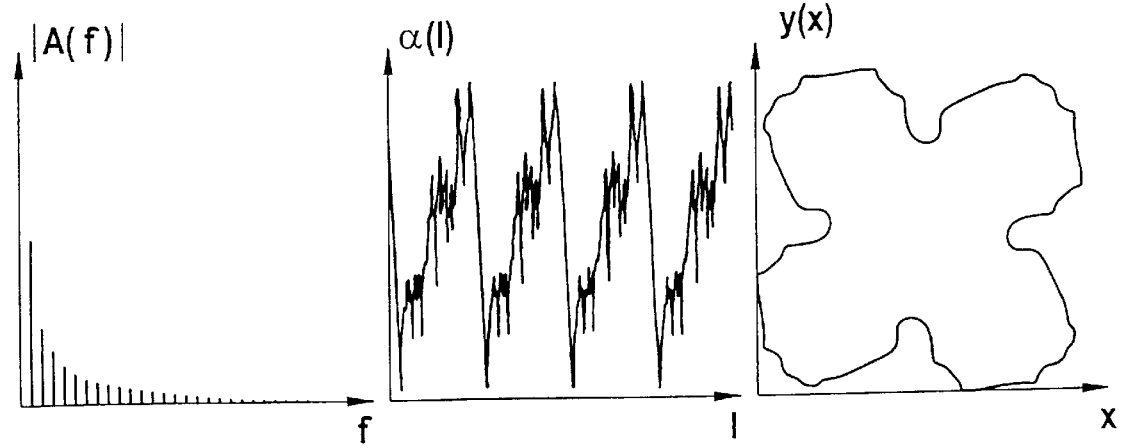
Figure 3G:
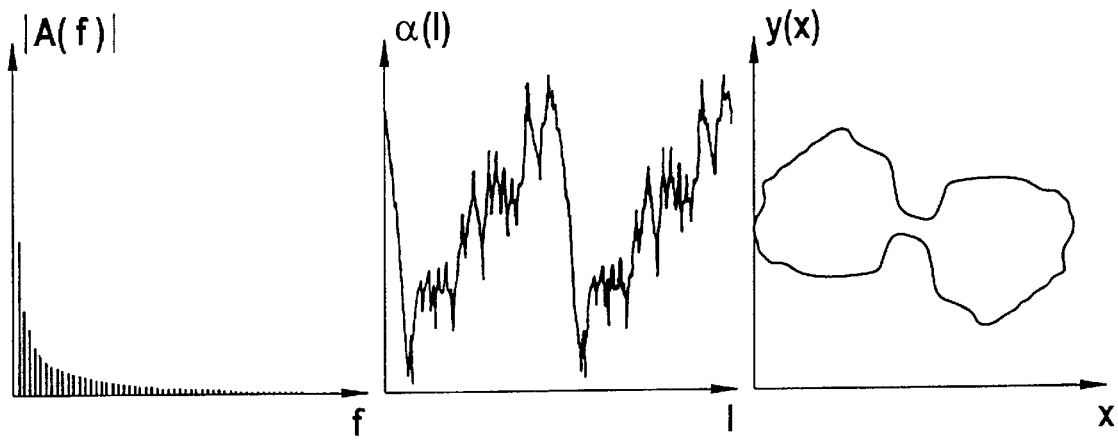
FIGS. 3g and 3h show manipulations of the object shown in FIG. 3f and obtained by manipulation, in which the spectrum has been successively compressed by a factor of two in each case.
Figure 3H:
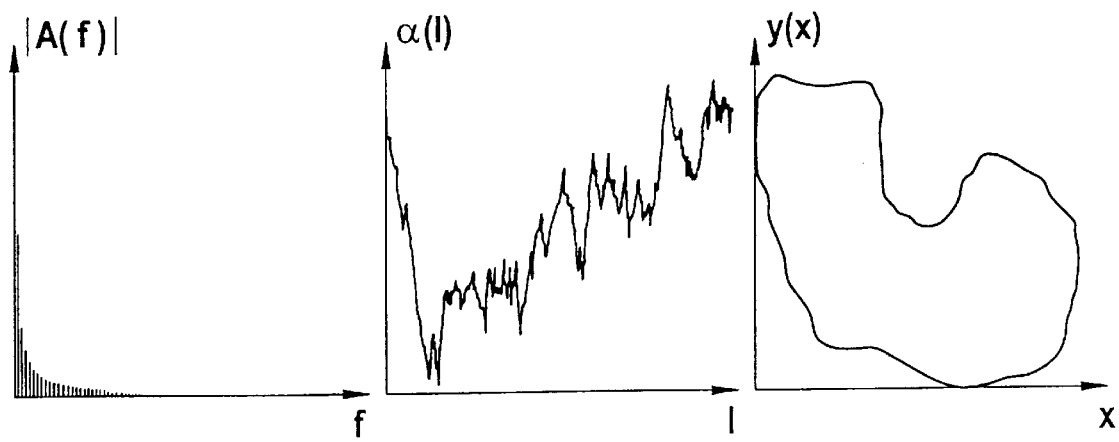
Figure 3I:
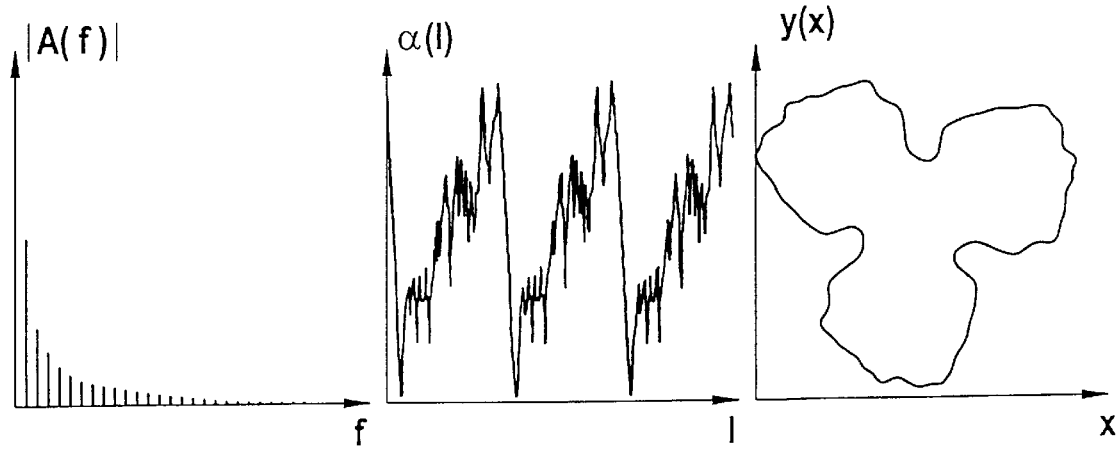
FIGS. 3i and 3j show manipulations of the object shown in FIG. 3h and obtained by manipulation, in which the spectrum has been successively expanded by a factor of three in each case.
Figure 3J:
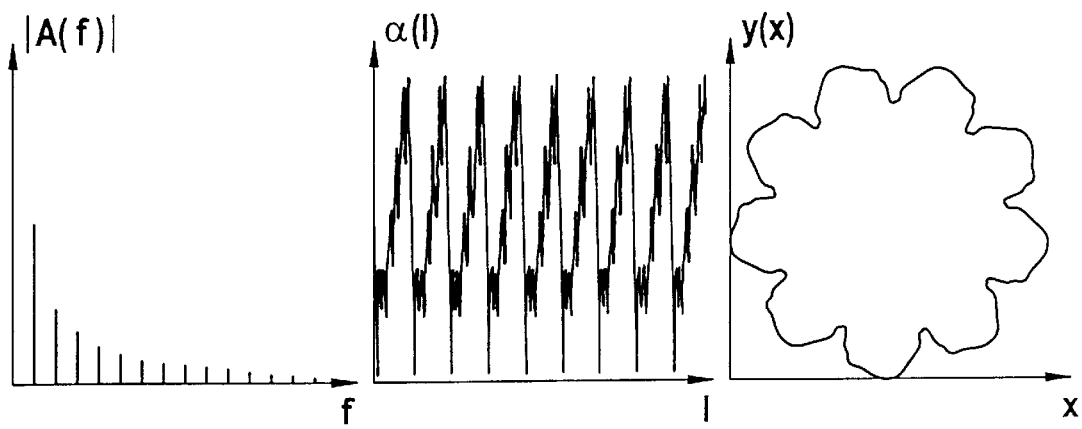
Figure 3K:
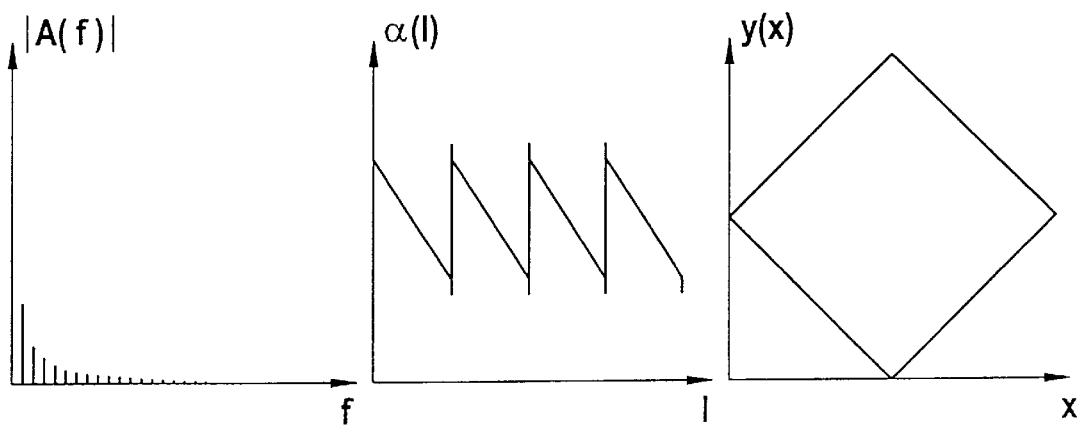
FIG. 3k shows a square used as the basis for manual modification of spectra.
Figure 3L:
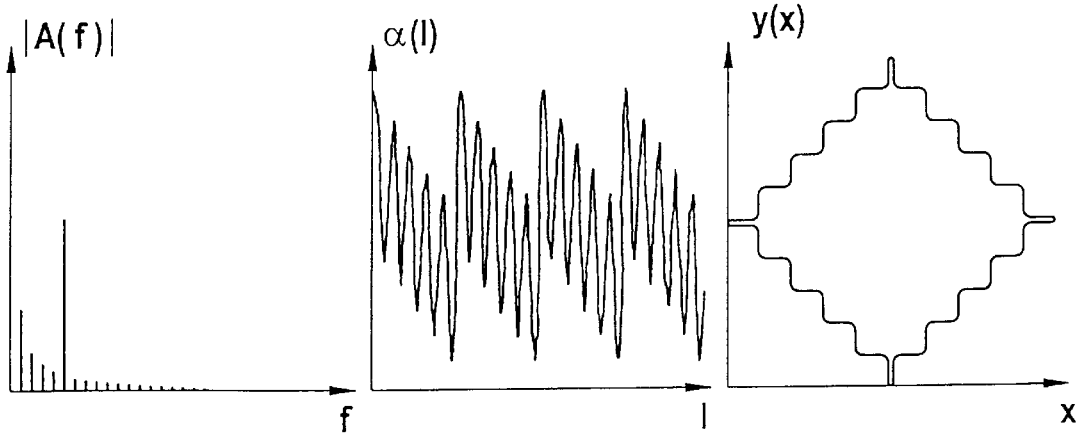
FIGS. 3l to 3n show objects obtained by manipulation of the object shown in FIG. 3k, when the amplitude at f=20 is increased, when the amplitude at f=36 is increased and when further amplitudes are increased.
Figure 3M:
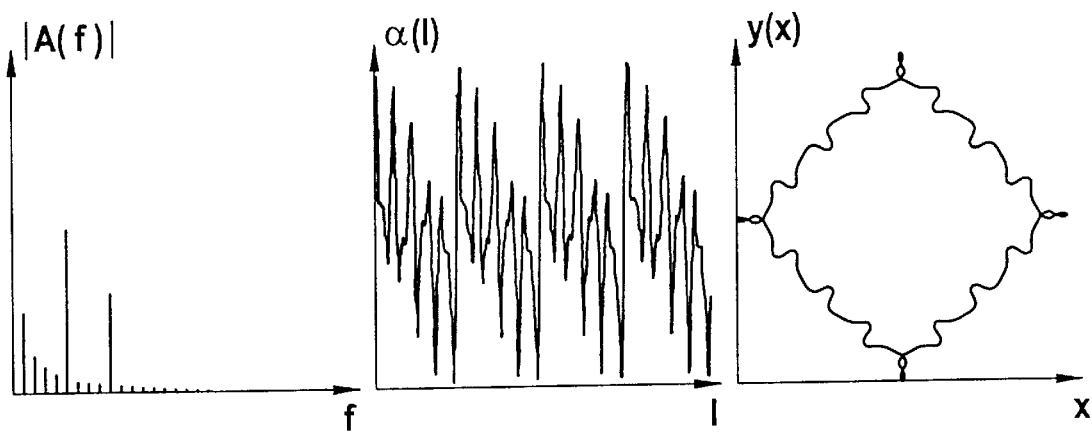
Figure 3N:
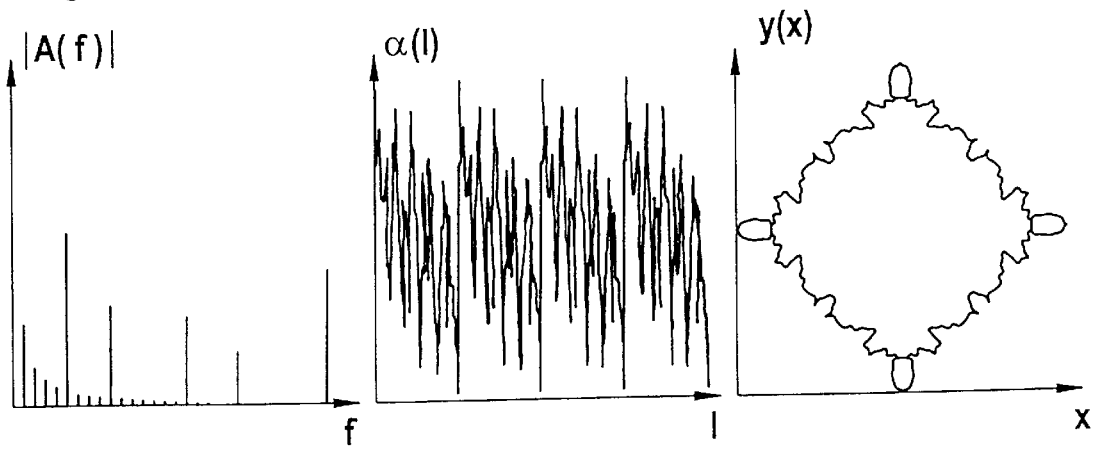

This technique is illustrated in more detail in FIGS. 3a to 3n. In FIG. 3a, a rectangle plotted in the x and y coordinate axes is shown as the geometric object at the right, the corresponding α(1) is shown in the middle and the amplitude A(f) of the Fourier spectrum is shown at the left. As already explained, the function α(1) is a function from which a function increasing linearly from 0 to $2\pi$ is subtracted in order to avoid a discontinuity when the starting point is reached again. As a result, the step function obtained for a square is transformed to the sawtooth function shown in the middle of FIG. 3a. The left part of FIG. 3a shows the amplitudes |A| of the Fourier coefficients:

$$A(f) = \int_0^{lmax} \alpha(l) e^{\frac{2\pi}{lmax} i f l} dl$$

On the other hand, the phases of the complex numbers A(f) are not shown. Nevertheless, these are also computed and stored, since otherwise it is not possible completely to regenerate the curve of the function α(1) and thus the underlying object from the values of the Fourier transform. The functional dependence U(s), which in this case means A(f), must therefore be computed and stored in such a way that complete invertibility (bijectivity) can be achieved. Even α(1) must be an invertible or bijective function.

In FIGS. 3b to 3n, the spectrum explained in the foregoing and thus U(s) are manipulated by simple operations. In FIGS. 3b and 3c, this manipulation takes place, for example, by replacement of the respective phases by random numbers. FIG. 3d is derived from FIG. 3a by scaling up the amplitudes by a factor of 2, and FIGS. 3e and 3f are derived from FIG. 3d once again via phases generated by random numbers ("random phases"). FIGS. 3g and 3h are derived from FIG. 3f by successive compression (i.e., scaling) of the function U(s) along the s-axis by a factor of 2. FIGS. 3i and 3j are derived from FIG. 3h by successive expansion (i.e., the inverse of compression) by a factor of 3. Finally, FIGS. 3k to 3n present examples of manual modification of U(s).

For sample shaping, the user can therefore . . . with an arbitrary geometric object (e.g., even a simple) by random phase, scaling, expansion, compression, translation, addition, subtraction, multiplication, division or manual shaping of spectra, but also even directly or as a function. In fact, the manipulations can even be applied in such a way that they affect not the entire object or the entire U(s), but only portions thereof.

As an example, pattern shaping can be achieved interactively as follows: The user draws a geometric object with a graphical input device. As soon as it is input, the object is transformed to a function and to U(s) as well as to further representations of the object suitable for manipulation of the object, and in all representations is simultaneously displayed graphically in different windows. In each of its representations, the object can be manipulated graphically or with analytical instructions, the parameters of which can be defined graphically if necessary. For example, in order to add to a given spectrum the same or different spectrum after translation or expansion, a particular value of s in the display of U(s) can be selected using a graphical input device, in order to define the degree of translation or expansion.

From the foregoing description it is therefore apparent that the scale-dependent characterizing variable U(s) is a decisive factor in pattern recognition and similarly in pattern shaping. It is important that a large part of the shaping process can also be completed automatically, in that the scale-dependent roughness of a characterizing variable is input beforehand in this case. Thus the user's first action is to define the coarse structure of an object. The details, or in other words irregular structures on a finer scale, are subsequently calculated automatically from the stored values of U(s). Since different possibilities still exist, in other words since U(s) alone still does not define the finished object unambiguously, additional options are offered. The coarse object input beforehand by the user is then used at least as the starting point, but can also be used as a template for automatic shaping.

For example, the object input beforehand by the user can be incorporated in self-similar manner on a finer scale. Furthermore, however, it is also possible to apply the automatic fine-scaled roughening via predefined geometries such as a triangle, a polygon or a sine curve, or even to do so statistically. Referring to FIG. 4, this is demonstrated hereinbelow in a practical example for the boundary of a two-dimensional object.

An object is predefined by the coordinates established by the user for a number of points in n-dimensional space. Depending on the dimension involved, the points span, for example, a boundary, an area or a volume. Through the irregularity of distribution of these points, the roughness is defined at least for one scale. The nature of this roughness can be used as the template for automatic shaping on the other scales. Referring to FIG. 4, this is explained in more detail hereinbelow for the shaping of the one-dimensional boundary of an area.

Step 1: According to FIG. 4a, points are first defined. According to FIG. 4b, the next step 2 is to connect these points automatically by predefined one- dimensional geometric objects (namely by straight lines in the example shown), thus forming a closed polygon. The "zeroth approximation" boundary R(0) is therefore defined in this way.

Step 3: Active zones (namely subsections of the boundary or even the entire boundary) on which the subsequent operations are to be performed are now defined.

Step 4: The functional dependence U(s) and thus the scale-dependent degree of roughening for the active zones are defined by the user. Subsequently, the straight lines are automatically elongated by a corresponding percentage by roughening.

Figure 4C:
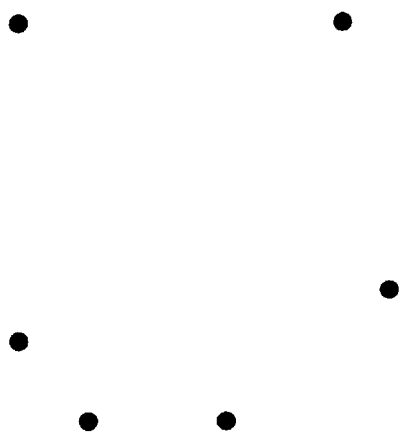
Figure 4C:
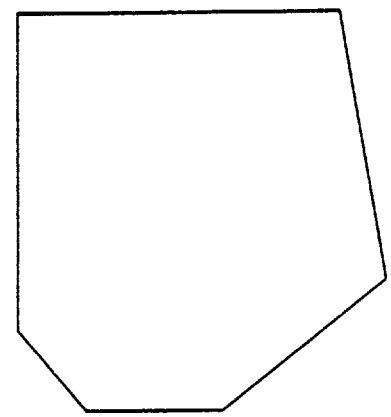
Figure 4C:
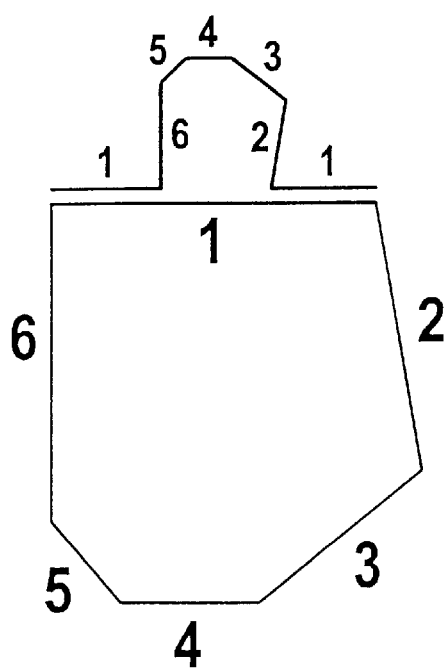
Figure 4C:
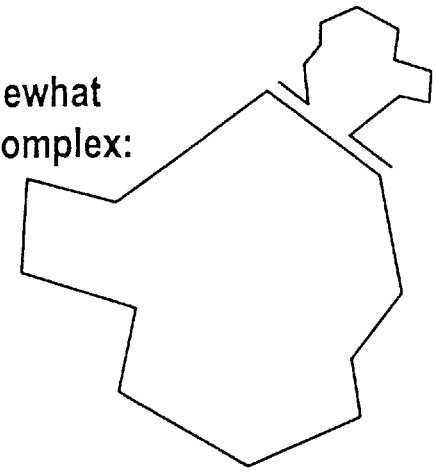

Step 5: The type of roughening is defined by the user. Numerous possibilities for roughening a side are available. Several options can be provided in this connection, such as:

A fractal, self-similar option, in which the complete boundary R(0) is incorporated on a reduced scale in its own subsegments (see FIG. 4c). The respective type can be defined by markings.

Figure 4D:
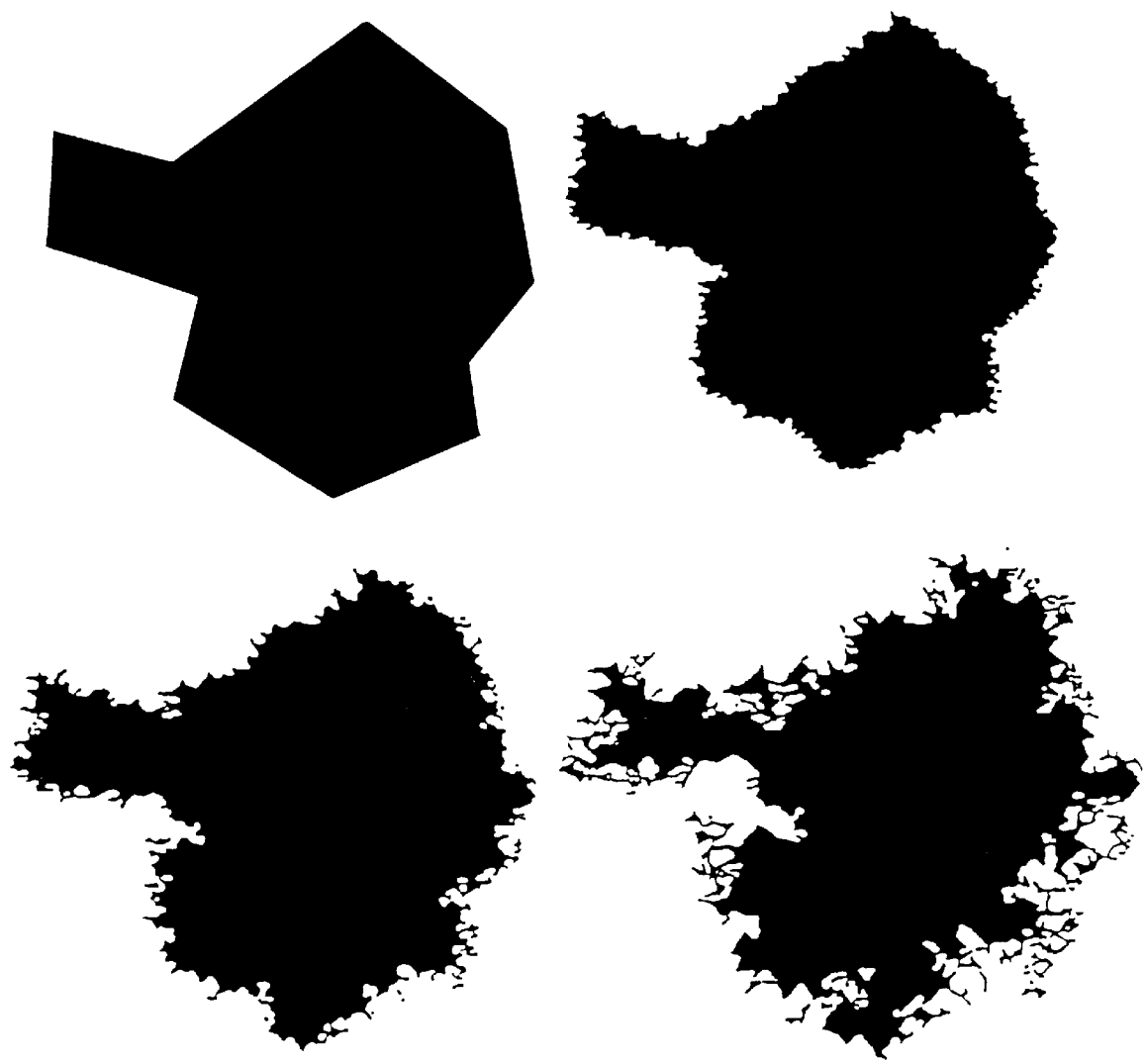
Figure 4E:
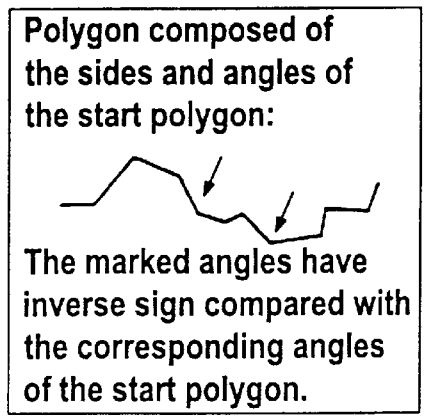
Figure 4E:
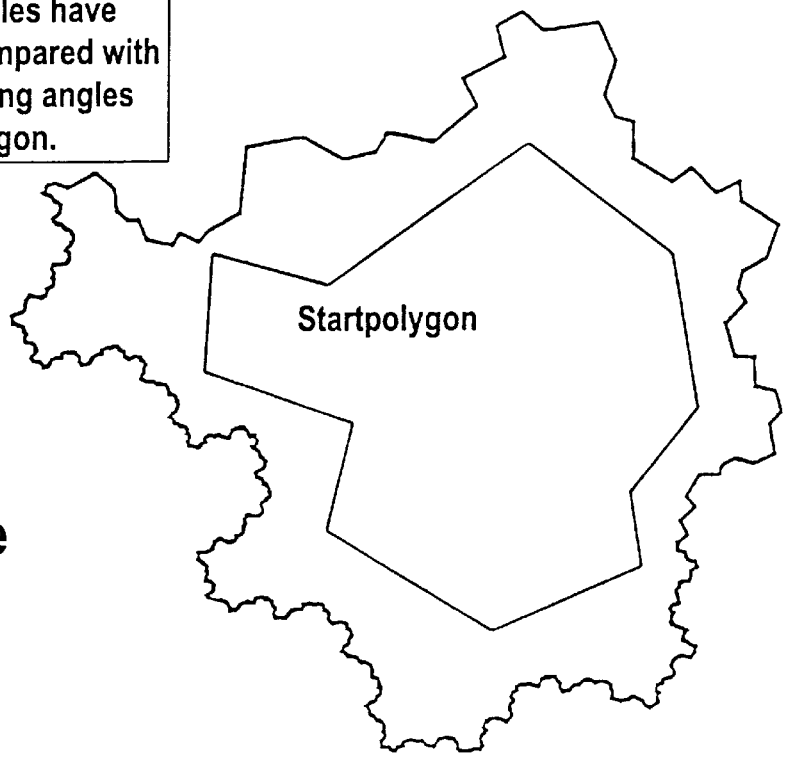
Figure 4F:
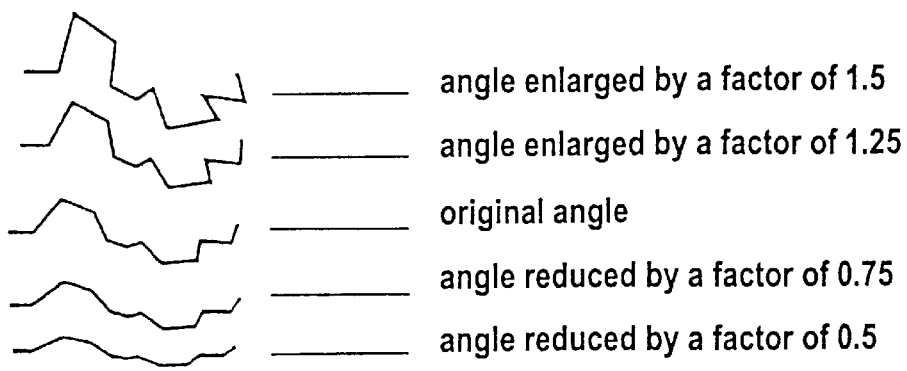

A statistical option, in which the type of roughening is defined by random methods (and the degree of roughening by U(s)) (see FIG. 4d).

An angle-preserving option, in which the angles occurring in R(0) can be plotted successively to generate a polygon. The length of the sides of the polygon correspond to the sides of R(0) and are all reduced proportionally by the same factor. The signs of the angles can be determined statistically or on the basis of specific rules. Polygons with varying concavity or convexity can be generated by means of such rules (see FIG. 4e).

An option that is self-similar with respect to length and proportional with respect to angle. This option is similar to the fractal option. However, the angles of R(0) are not necessarily preserved in this case, but are proportionally enlarged or reduced until U(s) has reached the desired value (see FIG. 4f). An option in which predefined geometries (waves, triangles, rectangles, etc.) or user-defined (or drawn) geometries are used (see FIG. 4f).

Of course, the foregoing options can also be combined.

Step 6: The sides in R(0) are replaced by the calculated polygons. The sides of the polygons are then replaced by appropriate polygons (allowing, of course, for U(s)), and so on. These operations are repeated on a progressively finer scale until the pixel size, or in other words the maximum displayable accuracy, is reached.

A further parameter which may be freely selectable is the phase, or in the discrete case the sequence or permutation of the side segments. When a side is replaced by a polygon, the sequence of polygon sides, for example, can be statistically determined. However, the sequence can also be permuted by comparison with the neighboring polygons or can even be the same. A scale-dependent phase is defined in that not only the amplitude but also the "start side" for a given point is defined with U(s). Thus U(s) is a complex function having amplitude and phase.

As regards further effects, steps of the technique and advantages of the invention not explained in more detail, express reference is made to the disclosure of the figures.

We claim:

1. A technique for pattern recognition, in which the pattern of an n-dimensional object is measured by means of a data-processing system capable of mapping and processing the n-dimensional object with different accuracy (s) in computer memory, characterized in that
a) the n-dimensional object is mapped in at least two different accuracy (s) in computer memory,
b) for each mapped accuracy (s) at least one characterizing variable (U) of the n-dimensional object is determined by integration or summation, and in that
c) the functional dependence (U(s)) of the integrated or summed characterizing variable(s) on accuracy (s) is determined and used as a measure of the pattern to be recognized.

2. A technique according to claim 1, characterized in that, by means of the data-processing system, at least one relevant property of the n-dimensional object is mapped in computer memory, and in that a grand total of the relevant property is calculated as the integral characterizing variable.

3. A technique according to claim 2, wherein
each one of said at least one relevant property comprises one of
topography, color distribution, surface, boundary profile, and density distribution.

4. A technique according to claim 2, wherein
said grand total of the relevant property comprises one of total volume, total value of color density, total surface, total boundary length, and total value of density.

5. A technique according to claim 1, characterized in that the integral characterizing variable (U) and/or the accuracy (s) is normalized to a specified quantitative value of the n-dimensional object.

6. A technique according to claim 5, characterized in that the quantitative value used for normalization is volume, area, surface or periphery of the n-dimensional object.

7. A technique according to one claim 1, characterized in that an accuracy (s) dependent fractal dimension of the n-dimensional object is determined as the functional dependence (U(s)).

8. A technique according to claim 1, characterized in that the functional dependence (U(s)) is determined by an averaging technique, in which the accuracy (s) represents the geometric extent or the thickness of the averaging process.

9. A technique according to claim 1, characterized in that the functional dependence (U(s)) is determined by grid generation, in which the accuracy (s) represents the fineness of the grid and in which the resulting elements of irregular objects are replaced by predefined elements.

10. A technique according to claim 9, wherein said predefined elements comprise predefined plane elements.

11. A technique according to claim 1, characterized in that the pattern to be recognized is identified by comparison of the measured functional dependence (U(s)) with stored characteristic curves.

12. A technique according to claim 1, characterized in that the respective accuracy (s) is derived from a resolution or faithfulness to detail with which the n-dimensional object is mapped in computer memory.

* * * * *